United States Patent [19]

Howard

[11] 4,048,722
[45] Sept. 20, 1977

[54] CHAIN SAW ATTACHMENT

[76] Inventor: Byron W. Howard, Hot Springs, Mont. 59845

[21] Appl. No.: 700,178

[22] Filed: June 28, 1976

[51] Int. Cl.² ........................................ B27B 17/08
[52] U.S. Cl. ...................................... 30/386; 30/122; 30/371
[58] Field of Search .............. 30/296 R, 381, 382, 30/383, 384, 386, 500, 371, 122, 166

[56] References Cited

U.S. PATENT DOCUMENTS

| 3,343,613 | 9/1967 | Carnesecca | 30/381 X |
| 3,580,342 | 5/1971 | Matthews | 30/381 X |
| 3,657,813 | 4/1972 | Knight | 30/296 R |
| 3,731,382 | 5/1973 | Wroe | 30/381 |

Primary Examiner—Jimmy C. Peters
Attorney, Agent, or Firm—Merchant, Gould, Smith, Edell, Welter & Schmidt

[57] ABSTRACT

A new sawing arrangement and a new attachment for use in such an arrangement. An elongated rigid power train is interposed between the power unit and the cutting head of a chain saw. It is secured to and chain driven by the former, and to it the latter is secured in driving relation.

2 Claims, 7 Drawing Figures

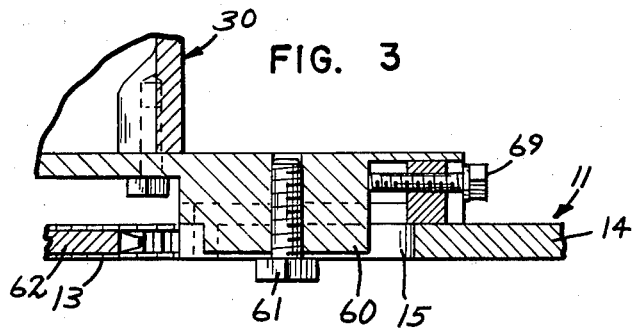
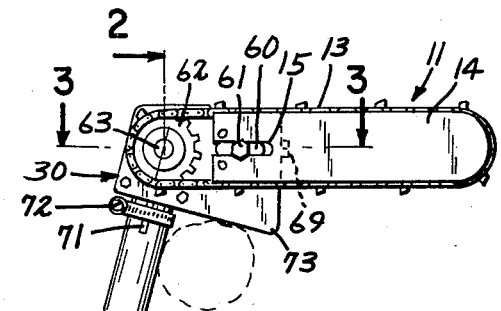
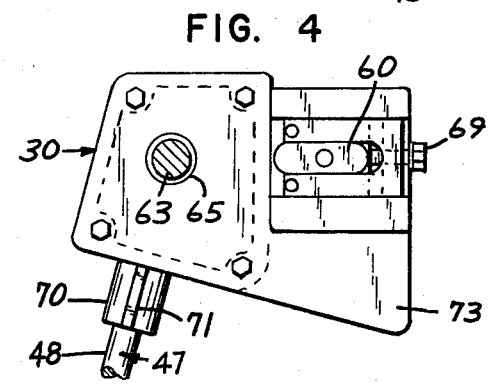
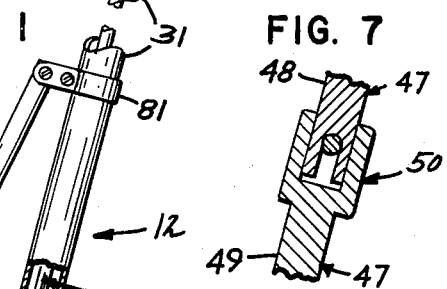
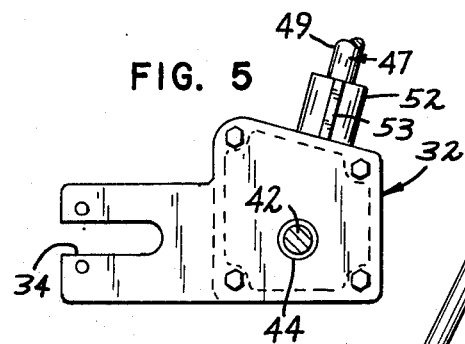
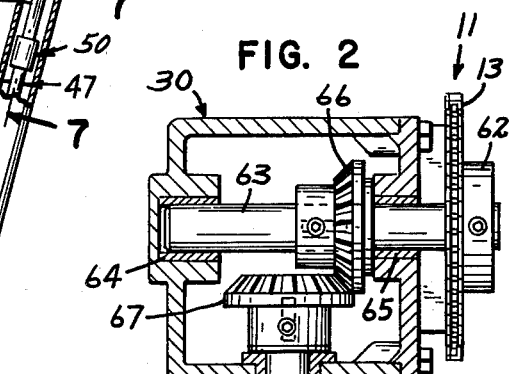
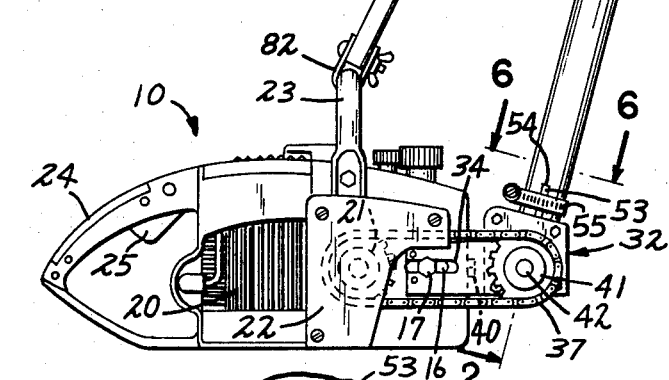
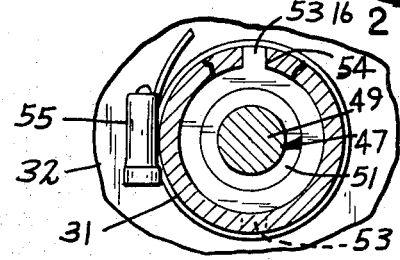
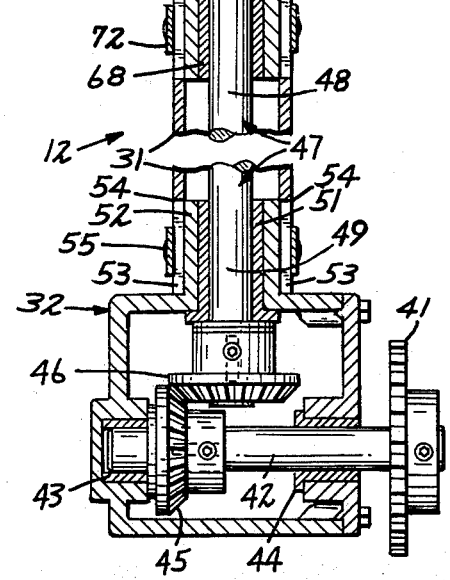

CHAIN SAW ATTACHMENT

BACKGROUND OF THE INVENTION

This invention relates to chain saws, and comprises an attachment or extension which may be inserted between the cutting head and the power unit of a chain saw to enable its use by a person standing on the ground or on a ladder to cut branches normally out of reach. In a conventional chain saw, the cutting head is close-coupled to the power unit, so that the chain which has the cutter links directly engages the driving sprocket of the power unit. In such saws, the cutting edge is seldom more than 18 inches beyond the user's hand.

This is very convenient for felling and working up felled trees and logs, but is limited by the useful reach of an operator whether standing on the ground or on a ladder.

SUMMARY OF THE INVENTION

The present invention comprises an attachment for a chain saw by which the cutter head may be displaced from the power unit be a very considerable distance, thus greatly increasing the reach of a user. By proper selection of materials, the extension may be kept at minimum weight, and its installation and removal are simple and require little time. The combination of the attachment with a chain saw is also within the ambit of my invention.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which is illustrated and described a preferred embodiment of the invention.

BRIEF DESCRIPTION OF THE DRAWINGS

In the drawings,

FIG. 1 is a side view of a chain saw to which an extension according to my invention has been added, parts being broken away or shown in dotted lines for clarity of illustration;

FIG. 2 is an enlarged sectional view generally along the line 2—2 of FIG. 1;

FIG. 3 is a fragmentary sectional view along the line 3—3 of FIG. 1, on an enlarged scale;

FIG. 4 is a view to a larger scale of the upper housing of my invention;

FIG. 5 is a view to a larger scale of the lower housing of my invention;

FIG. 6 is an enlarged fragmentary sectional view along the line 6—6 of FIG. 1, parts being broken away for clarity; and FIG. 7 is a fragmentary sectional view along the line 7—7 of FIG. 1, on an enlarged scale.

DESCRIPTION OF THE PREFERRED EMBODIMENT

A chain saw embodying my invention is shown in FIG. 1 to comprise a power unit 10, a cutter head 11, and a rigid, elongated interconnecting power train 12. Cutter head 11 includes a cutter chain 13 and a blade or guide 14 slotted at 15. Power unit 10 is formed at 16 to receive the slot of member 14 and retain it by a suitable fastener 17: it comprises a suitable engine 20 for driving a sprocket wheel 21 protected by a cover 22. Sprocket wheel 21 is ordinarily engaged by chain 13 of head 11. Also a part of unit 10 is a supporting handle 23, and a second handle 24 including a control trigger 25.

Power train 12 includes an upper housing 30, an elongated rigid tubular member 31, a lower housing 32, and a brace 33. As shown in FIGS. 1 and 5, lower housing 32 is configured with a slot 34 to be secured in power unit 10 by fastener 17. A chain 37 tightened by the usual adjusting screw 40 transmits power from unit 30 to a first sprocket wheel 41 mounted on a first stub shaft 42 carried in a pair of bearings 43 and 44 in housing 32. Power from shaft 42 is transmitted through a pair of bevel gears 45 and 46 to a two-part shaft 47 extending through tubular member 31, the portions 48 and 49 of shaft 47 being removably joined as by a pin and socket connection 50 suggested in FIG. 7. Shaft portion 49 is carried in a bearing 51 in housing 32, which has a hub 52 with lateral spurs 53. The lower end of tubular member 31 is slotted at 54 to receive spurs 53, and is compressed about hub 52 by a suitable clamp 55. The general direction of chain 37 from shaft 42 is skewed at a large acute angle to the general direction of the axis of shaft 47 from shaft 42.

As shown in FIGS. 1 and 4, upper housing 30 is configured at 60 to receive cutter head 11 and secure it in place by a fastener 61. Cutter chain 13 rides over a second sprocket wheel 62 on a second stub shaft 63 carried in a pair of bearings 64 and 65 in housing 30. Shaft 63 is driven through a pair of bevel gears 66 and 67 from shaft portion 48, carried in a bearing 68 in housing 30. A chain tightening adjustment including a screw 69 is also provided. Housing 30 has a hub 70 with spurs 71, and tubular member 31 is slotted and secured by a clamp 72 to the housing as described above. The general direction of chain 13 from shaft 63 is skewed at a large acute angle to the general direction of the axis of shaft 47 from shaft 63.

A special feature of housing 30 is a downwardly projecting nose 73 referred to again below.

Brace 33 comprises a diagonal member 80 extending downwardly from a bracket 81 secured to member 31 at a location remote from power unit 10, and is removably fastened to handle 23 by a suitable connection 82.

OPERATION

The operation of my invention should now be evident. When the chain saw user desires to use his saw for cutting beyond his normal reach, he loosens screw 17 and removes cutting head 11, which he installs on housing 30 by tightening fastener 61, adjusting chain tension by screw 69. He now fastens housing 32 to unit 10 by fastener 17 after chain 37 has been adjusted to engage sprocket wheels 21 and 41, again adjusting for chain tension by screw 40. Brace 80 is connected to the handle 23 by connection 82. The engine may now be started, and operation of trigger 25 causes engine 10 to drive through sprocket wheel 21, chain 37, sprocket wheel 41, stub shaft 42, bevel gears 45 and 46, shaft portion 49, coupling 50, shaft portion 48, bevel gears 67 and 66, stub shaft 63, and sprocket 62 to cutting chain 13. To add convenience in overhead work, the assembly can be raised above the branch 90 to be cut and allowed to rest on nose 73 for rough positioning, the nose being slidable along the branch to the exact location desired and then drawn toward the operator until the nose moves out of contact with the branch and the blade drops thereon to cut at precisely the desired spot.

From the foregoing, it will be evident that I have invented a new arrangement for chain sawing objects beyond the normal reach of a chain saw user, comprising the combination of a chain saw with a new extension attachment adapted for interposition between the power unit and the cutter head of the saw. A special housing feature makes it convenient to cut at precisely chosen locations.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. In combination with a chain saw, having a power unit including a first driving sprocket wheel, a cutter head including an endless cutter chain for directly engaging said first driving sprocket wheel, and means removably mounting said cutter head on said power unit so that said cutter chain extends from said power unit in a predetermined direction, a rigid elongated interconnecting power train for interposition between said power unit and said cutter head to provide an extended working position for said cutter head relative to said power unit, said power train comprising an elongated rigid tubular member;

a power shaft in two longitudinally separable parts traversing said tubular member and carried in bearings in the ends thereof for rotating therein about an axis;

means at one end of said tubular member for connecting said tubular member to said power unit for drive and support thereby, including a first housing configured for supportive connection to said power unit instead of said cutter head, means connecting said first housing to said tubular member and preventing relative rotation therebetween about the axis of said power shaft, a first stub shaft projecting from said first housing in a direction orthogonal to said axis and carried in bearings in said first housing, a driving connection in said first housing from said first stub shaft to said power shaft, a driven sprocket wheel carried on said first stub shaft outside said first housing for alignment with said first driving sprocket wheel, and an endless driving chain for conducting power from said first driving sprocket wheel to said first driven sprocket wheel;

means at the other end of said cutter head for connecting said tubular member to said cutter head for drive and support thereof instead of said power unit, including a second housing configured for supportive connection of said cutter head, means connecting said second housing to said tubular member and preventing relative rotation therebetween about said axis of said power shaft, a second stub shaft projecting from said second housing in a direction orthogonal to said axis and carried in bearings in said second housing, a driving connection in said second housing from said power shaft to said second stub shaft, and a second driving sprocket wheel carried on said second stub shaft outside said second housing for alignment with said cutter chain, said first and second housing being so oriented with respect to said tubular member that when said interconnecting power train is interposed between said power unit and said cutter head, said endless cutter chain has the same general direction as said endless drive chain, and said axis of said power shaft is skewed at large acute angles with respect thereto, said second housing further including a nose located beside said cutter chain in the extended working position of said cutter head and having a surface substantially orthogonal to said tubular member and extending laterally beyond said cutting chain for a portion of the length thereof for cooperation with said tubular member to comprise a rest for supporting said power train on a branch to be cut, while said cutter chain is in operation, without causing cutting of the branch;

and rigid brace means connected at one end at an acute angle to said tubular member near said second housing, and adapted for rigid connection to said power unit at a location displaced from the connection thereto of said first housing, for maintaining the orientation of said interconnecting power train with respect to said power unit.

2. For use with a chain saw, having a power unit including a first driving sprocket wheel, a cutter head including an endless cutter chain for directly engaging said first driving sprocket wheel, and means removably mounting said cutter head on said power unit so that said cutter chain extends from said power unit in a predetermined direction, a rigid elongated interconnecting power train for interposition between said power unit and said cutter head to provide an extended working position for said cutter head relative to said power unit, said power train comprising an elongated rigid tubular member;

a power shaft in two longitudinally separable parts traversing said tubular member and carried in bearings in the ends thereof for rotating therein about an axis;

means at one end of said tubular member for connecting said tubular member to said power unit for drive and support thereby, including a first housing configured for supportive connection to said power unit instead of said cutter head, means connecting said first housing to said tubular member and preventing relative rotation therebetween about the axis of said power shaft, a first stub shaft projecting from said first housing in a direction orthogonal to said axis and carried in bearings in said first housing, a driving connection in said first housing from said first stub shaft to said power shaft, a driven sprocket wheel carried on said first stub shaft outside said first housing for alignment with said first driving sprocket wheel, and an endless driving chain for conducting power from said first driving sprocket wheel to said first driven sprocket wheel;

means at the other end of said tubular member for connecting said tubular member to said cutter head for drive and support thereof instead of said power unit, including a second housing configured for supportive connection of said cutter head, means connecting said second housing to said tubular member and preventing relative rotation therebetween about said axis of said power shaft, a second stub shaft projecting from said second housing in a direction orthogonal to said axis and carried in bearings in said second housing, a driving connection in said second housing from said power shaft to said second stub shaft, and a second driving sprocket wheel carried on said second stub shaft outside said housing for alignment with said cutter chain, said first and second housings being so oriented with respect to said tubular member that when said interconnecting power train is interposed between said power unit and said cutter head, said endless cutter chain has the same general direction as said endless drive chain, and said axis of said power shaft is skewed at large acute angles with respect thereto; and rigid brace means connected at one end at an acute angle to said tubular member near said second housing, and adapted for rigid connection to said power unit at a location displaced from the connection thereto of said first housing, for maintaining the orientation of said interconnecting power train with respect to said power unit.

* * * * *